June 26, 1923.
J. B. ROESCH
DEMOUNTABLE RIM
Filed Feb. 21, 1922
1,460,278
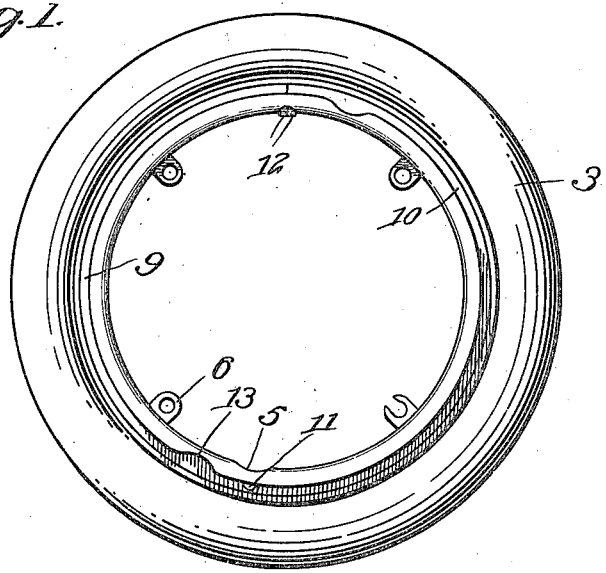
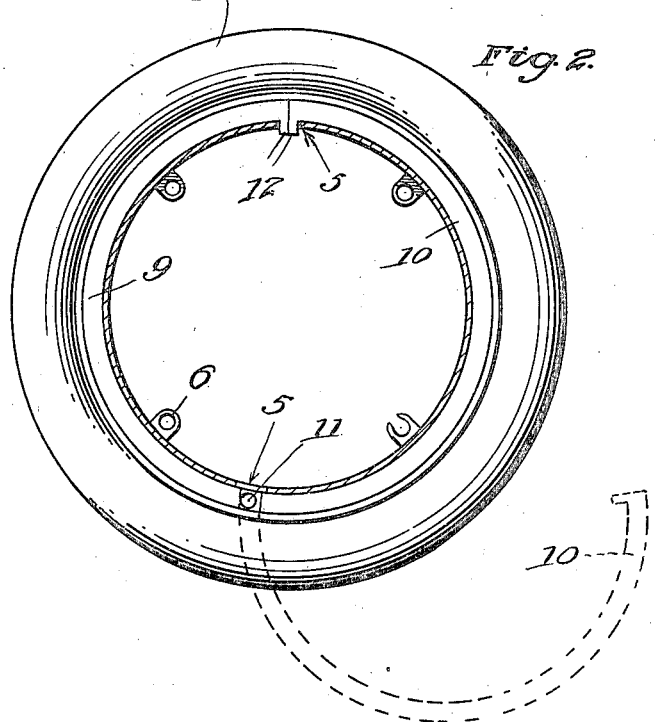
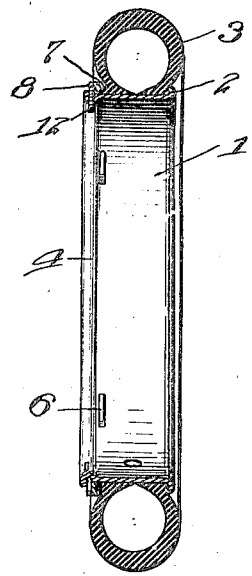
Joseph B. Roesch
Inventor.
By William C. Linton
Attorney.

Patented June 26, 1923.

1,460,278

UNITED STATES PATENT OFFICE.

JOSEPH B. ROESCH, OF OLD FORGE, PENNSYLVANIA.

DEMOUNTABLE RIM.

Application filed February 21, 1922. Serial No. 538,217.

*To all whom it may concern:*

Be it known that I, JOSEPH B. ROESCH, a citizen of the United States of America, residing at Old Forge, in the county of Lackawanna and State of Pennsylvania, have invented certain new and useful Improvements in Demountable Rims; and I do hereby declare that the following is a full, clear, concise, and exact description of the invention, such as will enable others skilled in the art to which it appertains to make and use the same.

This invention relates to improvements in demountable wheel rims, having for an object to provide a demountable rim employing a novel form of clamping or receiving ring whereby the beaded or heel portions of a pneumatic tire tube will be snugly and positively engaged and held upon the wheel rim against undue movement or displacement.

It is likewise an object of the invention to provide a rim with means for locking the shoe clamping flange or ring with engagement with the demountable rim, the same being of such construction as will permit its arrangement upon the rim in but a minimum amount of time and with the least possible effort upon part of a user and likewise, being readily and easily removed from the rim when changing tire tubes or the like.

Other objects will be in part obvious and in part pointed out hereinafter.

In order that the invention and its mode of operation may be readily understood by persons skilled in the art, I have in the accompanying illustrative drawings and in the detailed following description based thereon, set out one possible embodiment of the same:

In these drawings:

Figure 1 is a side elevation of the improved demountable rim;

Figure 2 is a vertical longitudinal section through the demountable rim, a segment or portion of the locking ring being shown in open position in dotted lines;

Figure 3 is a vertical transverse section through the improved demountable rim.

Having more particular reference to the drawings, in connection with which like characters of reference will designate corresponding parts throughout, the invention may be stated to comprehend a demountable rim 1 having a marginal flange 2 formed upon one side thereof affording means for engaging one side or heel of a pneumatic tire shoe such as shown in the drawings and indicated by the numeral 3, the opposite side portion of the demountable rim having a peripherally disposed channel or way 4 formed in the same in proximity to said opposite marginal portion and also having openings 5 formed therein in substantially diametrical relation, the purpose of which will be hereinafter described.

Apertured ears or lugs generally indicated by the numeral 6 are arranged upon the inner sides of the demountable rim 1, as clearly shown in the Figures 1 and 4 and as will be understood, serve as means for connecting bolts or similar fastening devices whereby the demountable rim may be immovably secured in position upon an automobile wheel or the like.

In order that the pneumatic tire shoe 3 may be secured to the demountable rim 1, a clamping ring 7 is provided and as will be noted, has the inner side thereof channeled or formed to snugly engage the adjacent beaded or heel portion of said shoe 3, while the outer side thereof is under cut as at 8 whereby proper engagement of the locking ring, hereinafter more fully described, may be had therewith.

With the clamping ring 7 in position upon the demountable rim 1, it will be noted that the pneumatic tire shoe 3 will be positioned in the manner as shown in the Figure 6, the bead or heel upon the far side of the shoe engaging in the flange or heel engaging means 2, while the remaining heel of the shoe is engaged in the inner side of the clamping ring 7.

To lock said clamping ring 7 against outward displacement or lateral movement from the demountable rim, a locking ring is provided and comprises segments 9 and 10, certain of the ends of which are hingedly interconnected as at 11, while inwardly disposed fingers 12 are formed upon the opposite or remaining ends thereof and as will be noted upon reference to the Figure 2, are adapted to be arranged in abutting relationship, whereby the same may be snugly engaged in that particular opening 5 formed in the bottom of the channel 4 adjacent the same. In hingedly interconnecting the segments 9 and 10 of the locking ring at 11, I may and preferably do arrange such connection eccentric to the medial frame thereof and as will be understood, by placing the ring in the channel 4 formed in the demountable rim 1 and engaging first the section 9 therein, the shorter or remaining section 10 when swung to its closed position as shown in full lines in Figure 2 will have that particular end thereof carrying the finger 12 placed under a tension sufficient to cause said finger to snap into engagement with the opening 5 upon inward movement or compression of the same in that direction.

When the fingers 12 of the locking ring sections 9 and 10 have been engaged in one of the openings 5 in the bottom of the channel 4 in the demountable rim 1, it will be understood that said ring will have been snugly fitted in the channel 4 throughout its circumference and in consequence, that lateral displacement of the ring with relation to the demountable rim will be prevented. Therefore, since lateral movement of the locking ring with relation to the demountable rim 1 will be prevented, it follows in consequence, that inasmuch as said locking ring is engaged with the under cut outer side 8 of the clamping ring 7, such clamping ring will be firmly held in engagement with that particular heel portion of the pneumatic tire shoe adjacent the same and accordingly, that the tire shoe will be positively secured in its position upon the demountable rim 1.

Removal of the tire shoe 3 may be quickly effected by first engaging a screw driver or similar implement under the free end of one of the segments of the locking ring, preferably under the free end portion of the segment 10 and then forcing said free end upwardly whereby to remove its finger 12 from the opening 5. At this time, the release segment of the ring may be readily swung downwardly as shown in dotted lines in the Figure 2, whereupon the remaining segment, which as will be recalled is shorter than the segment 10 may be readily removed from its particular portion of the channel 4 and the finger 12 upon the free end thereof disengaged from the opening 5. To facilitate the removal of the free end of the segment 10 from the channel 4, I may and preferably do form recesses or pockets 13 in those side portions of the demountable rim 1 in proximity to the several openings 5 formed in the bottoms of the annular channel 4. Thus, in this way, the reduced end of a screw driver or similar instrument may be readily engaged under the free portion of the segment of the locking ring to be initially disengaged from the demountable rim.

With the locking ring removed from the annular channel 4 in the demountable rim 1, the clamping ring 7 may be moved laterally from said rim, disengaging the adjacent heel portion of the pneumatic tire shoe 3 and by consequence, permitting ready lateral displacement of the shoe from the rim.

Manifestly, the construction shown is capable of considerable modification and such modification as is within the scope of my claim, I consider within the spirit of my invention.

I claim:

A demountable rim having a tire shoe heel engaging means on one side thereof and a peripherally disposed channel formed therein adjacent its opposite side, a clamping ring receivable over that portion of the rim having the channel therein engageable with the opposite side of the tire shoe and having an undercut side, a locking ring having an interior diameter the same as the exterior diameter of the bottom of the channel of said rim and receivable within said channel, said locking ring composed of two eccentrically pivoted segments, said segments being formed of spring material and having inwardly disposed fingers formed upon the free extremities thereof, the bottom of the channel of said rim having an opening therein whereby one segment of said locking ring may be placed within said channel and the other or longer segment of the locking ring may be snapped within said channel when the fingers of said segments are arranged in abutting relation and forced within said opening and the undercut side of said clamping ring being adapted to engage over the locking ring.

In witness whereof I have hereunto set my hand.

JOSEPH B. ROESCH.